US006603826B1

(12) United States Patent
Cupo et al.

(10) Patent No.: US 6,603,826 B1
(45) Date of Patent: Aug. 5, 2003

(54) METHOD AND RECEIVER FOR DYNAMICALLY COMPENSATING FOR INTERFERENCE TO A FREQUENCY DIVISION MULTIPLEX SIGNAL

(75) Inventors: Robert Louis Cupo, Eatontown, NJ (US); Mohsen Sarraf, Rumson, NJ (US); Mohammad Hossein Zarrabizadeh, Woodbridge, NJ (US); Mojtaba Shariat, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,936

(22) Filed: Sep. 15, 1999

(51) Int. Cl.[7] .............................................. H04L 25/08
(52) U.S. Cl. ..................... 375/346; 375/348; 375/350; 370/333; 455/63
(58) Field of Search ................................. 375/132, 136, 375/148, 240, 278, 284, 285, 340, 346, 348, 350; 455/61, 63, 67.3, 150.1, 161.3, 222, 226.2, 277.2, 278.1, 295, 296; 370/208, 319, 333, 344, 468, 480

(56) References Cited

U.S. PATENT DOCUMENTS

| | | | | |
|---|---|---|---|---|
| 4,267,605 A | * | 5/1981 | Matsuzawa et al. | ........ 455/266 |
| 5,278,844 A | * | 1/1994 | Murphy et al. | ............. 375/280 |
| 5,287,556 A | * | 2/1994 | Cahill | ......................... 455/266 |
| 6,047,171 A | * | 4/2000 | Khayrallah et al. | ......... 455/266 |
| 6,108,810 A | * | 8/2000 | Kroeger et al. | ............. 370/206 |
| 6,246,713 B1 | * | 6/2001 | Mattisson | .................... 370/343 |
| 6,259,893 B1 | * | 7/2001 | Kroeger et al. | ............. 375/346 |
| 6,347,122 B1 | * | 2/2002 | Chen et al. | .................. 375/219 |

OTHER PUBLICATIONS

Hagenauer, "Rate–Compatible Punctured Convolutional Codes (RCPC Codes) and their Applications," IEEE IEEE Transactions on Communications, vol. 36, No. 4, Apr. 1988 pp. 389–400.

Kroeger and Cammarata, "Robust Modem and Coding Techniques for FM Hybrid IBOC DAB," IEEE Transactions on Broadcasting, vol. 43, No. 4, Dec. 1997, pp. 12–419.

* cited by examiner

Primary Examiner—Chi Pham
Assistant Examiner—Khanh Cong Tran

(57) ABSTRACT

A method and a receiver for reducing adjacent-channel interference to a digitally modulated receive signal evaluates error rates of the receive signal associated with different receive bandwidths of the receive signal. The receiver selects a preferential bandwidth among the different bandwidths based on a suitably low error rate associated with the preferential bandwidth. The selection of the different bandwidths is achieved by digital signal processing that weighs desired data bits representing a desired bandwidth differently than rejected data bits representing a rejected bandwidth.

34 Claims, 6 Drawing Sheets

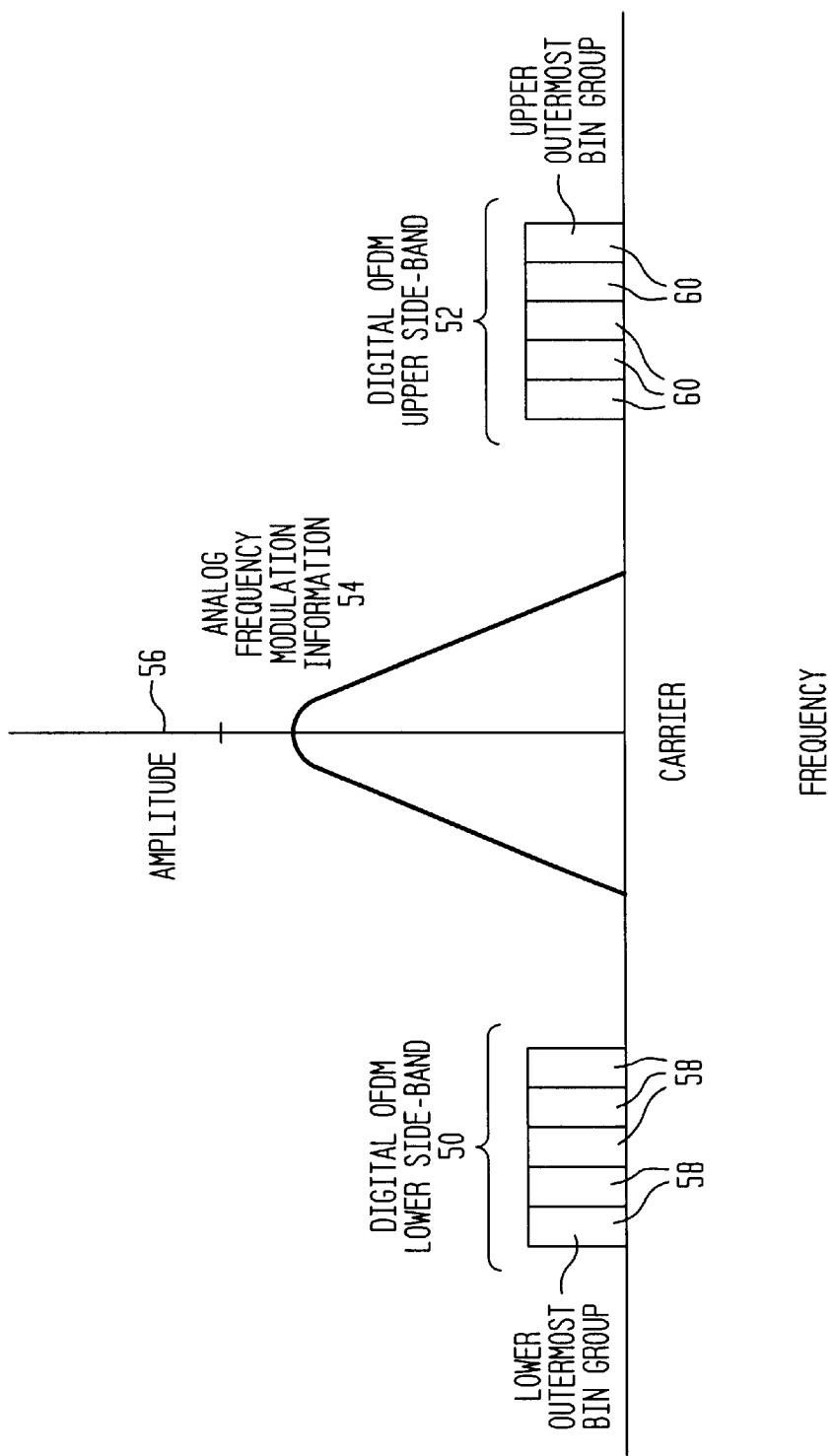

| TWO'S COMPLIMENT HEXADECIMAL INPUT | 0 | 1 | 2 | ... | 7E | 7F | 80 | 81 | 82 | ... | FE | FF |
|---|---|---|---|---|---|---|---|---|---|---|---|---|
| HEXADECIMAL METRIC FOR "1" | 7F | 7E | 7D | ... | 1 | 0 | FF | FE | FD | ... | 81 | 80 |
| HEXADECIMAL METRIC FOR "0" | 80 | 81 | 82 | ... | FE | FF | 0 | 1 | 2 | ... | 7E | 7F |

FIG. 5

METHOD AND RECEIVER FOR DYNAMICALLY COMPENSATING FOR INTERFERENCE TO A FREQUENCY DIVISION MULTIPLEX SIGNAL

FIELD OF THE INVENTION

This invention relates to a method and receiver for dynamically compensating for interference (e.g., adjacent-channel interference) to a frequency division multiplex signal.

BACKGROUND OF THE INVENTION

Commercial radio broadcasters currently transmit with analog frequency modulation in the frequency modulation (FM) band from 88 MHz to 108 MHz in the United States. The FM band provides high-fidelity music, stereo music and other programming to numerous listeners.

The transmission of an FM hybrid analog/digital signal is contemplated with a digital in-band on-channel (IBOC) modulation scheme to provide digitally modulated programming with an improved audio signal-to-noise ratio and an enhanced audio dynamic frequency response. A digital-in-band on-channel modulation scheme refers to transmission of the digital signal within the existing FM band in a manner compatible with the present FM channel spacing. The digital signal of IBOC modulation scheme complements the existing analog signal to allow complete backwards compatibility with existing analog FM receivers. Further, a single radio station could offer a hybrid broadcast signal with different programming on a digital signal component, than on an analog FM signal component, potentially doubling the amount of programming offered by each broadcast station.

In the U.S., the Federal Communications Commission (FCC) assigns channels with an adjacent channel separation of 400 KHz between carriers in the same geographic region to maintain appropriate levels of signal coverage and to reduce adjacent channel interference. However, in certain areas as little separation as 200 KHz is present so interference between adjacent analog FM channels can be problematic even without the addition of a digital signal component.

For U.S. channel spacings, the FM modulated signal usually varies from approximately 0 HZ to 100 KHz on each side of a carrier frequency. Certain IBOC modulation schemes transmit digital side-bands in at least part of the regions between approximately 130 kHz to 199 KHz away from the carrier frequency. At a transmitter for transmitting an FM hybrid analog/digital signal, the analog FM signal may be filtered out so as not to interfere with the digital side-bands. However, at the receiver, interference from adjacent FM analog or FM hybrid channels may corrupt or destroy the desired digital sidebands. If the receive bandwidth of the digital transmission is restricted at the receiver, the digital transmission becomes less resistant to fading and modulated information may be lost. Thus, a need exists for a receiver that can dynamically reduce or eliminate. adjacent channel interference, with a minor or coextensive impact on fading tolerance.

SUMMARY OF THE INVENTION

In accordance with the invention, a method and a receiver for reducing adjacent-channel interference to a digitally modulated receive signal evaluates error rates of the receive signal associated with different receive bandwidths of the receive signal. The receiver selects a preferential bandwidth among the different bandwidths based on a suitably low error rate associated with the preferential bandwidth. The selection of the different bandwidths is achieved by digital signal processing that weighs desired data bits representing a desired bandwidth differently than rejected data bits representing a rejected bandwidth.

In one aspect of the invention, an identifier identifies the receive data bits associated with a rejection bandwidth or a desired bandwidth. The desired bandwidth is readily realized in the digital frequency domain by selectively puncturing receive data bits with substantially neutral logical values to yield rejected data bits associated with a rejection bandwidth of the receive signal. The initial received logical value of the rejected bits are discounted or devalued to the neutral logical value to facilitate the reduction of interference upon decoding of the desired data bits. A neutral logical value represents neither a high logic level nor a low logic level.

BRIEF DESCRIPTION OF THE DRAWINGS

FIG. 2 is a frequency versus amplitude response for a hybrid digital/analog signal for receipt by the receiver of FIG. 1.

FIG. 5 is a look-up table for assigning mathematical distances between input data and a logical value indicating the probability that the input data actually represents the logical value.

DETAILED DESCRIPTION

Figure 1:
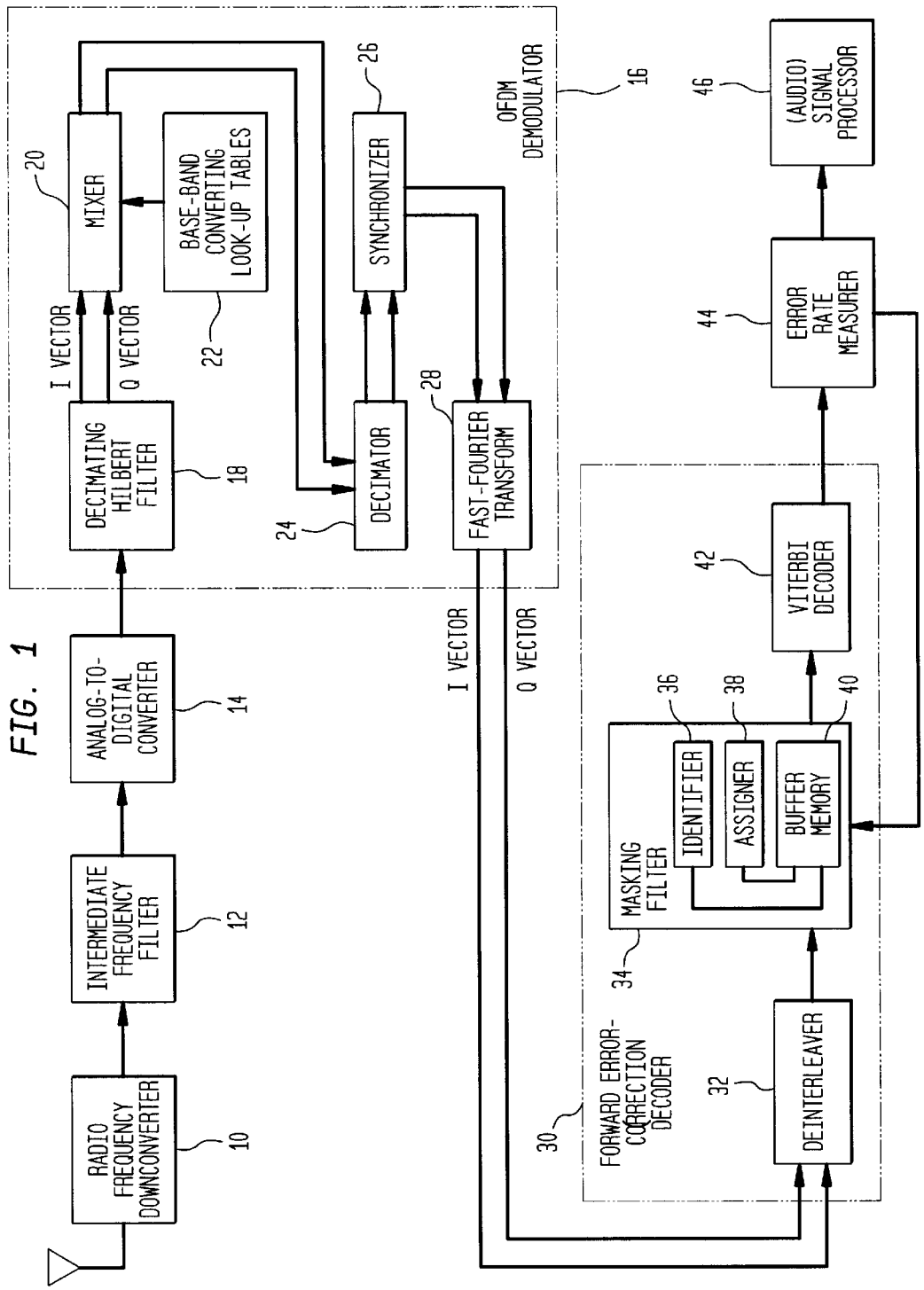
FIG. 1 is a block diagram of a receiver for receiving an orthogonal frequency division multiplex signal in accordance with the invention.

In accordance with an embodiment of the invention, FIG. 1 is a block diagram of a receiver for dynamically compensating for adjacent channel interference to a frequency division multiplex signal. FIG. 1 includes a radio frequency down-converter 10 which may be coupled to an intermediate frequency filter 12. The radio frequency down-converter 10 is directly or indirectly coupled to an analog-to-digital converter 14. The analog-to-digital converter 14 is coupled to an orthogonal frequency division multiplex (OFDM) demodulator 16. The OFDM demodulator 16 is coupled to a forward-error-correction (FEC) decoder 30. The forward-error-correction decoder 30 is coupled to an error rate measurer 44. An audio signal processor 46 is adapted to communicate with the forward-error correction decoder 30.

The radio frequency down-converter 10 includes a receiver front-end and a mixer to downconvert a receive signal from a carrier frequency (e.g., 88–108 MHz) to an intermediate frequency signal. The radio frequency front-end may tune the receiver front-end to the carrier frequency of a desired receive signal. The intermediate frequency filter 12 is a bandpass filter for removing or attenuating adjacent channel interference. For example, in the context of U.S. commercial broadcasts on the FM band, the bandpass filter comprises any suitable filter (e.g., ceramic filter) with a pass-band of approximately 400 KHz about the intermediate frequency.

The analog-to-digital converter 14 accepts the intermediate frequency signal and converts the intermediate frequency signal into a digital signal. The digital signal may comprise a pulse code modulation signal, a phase-shift keying signal, a multi-state quadrature amplitude modulation signal, or another suitable digital signal format. The digitally modulated signal is demodulated in the OFDM demodulator 16.

The OFDM demodulator 16 may be implemented by using a group of digital signal processors. The general functions of the digital signal processors are illustrated by the blocks representing the OFDM demodulator 16 of FIG. 1. Within the OFDM demodulator 16, a decimating Hilbert filter 18 provides an in-phase (I) and quadrature (Q) input to a mixer 20, while a base-band converting lookup table provides another input to the mixer 20. An output of the mixer 20 is at baseband frequency derived from the digital signal. The mixer 20 is logically coupled to a decimator 24. The decimator 24 communicates with a synchronizer 26, which in turn communicates with a fast-Fourier transform emulator 28 that emulates or otherwise exposes the baseband digital signal to a fast-Fourier transform. The OFDM demodulator 16 provides a demodulated in-phase channel output and a demodulated quadrature channel output once the fast-Fourier transform operation is completed.

The Hilbert filter 18 accepts a real digital signal and processes digital samples to provide in-phase and quadrature samples representing the real digital signal. The Hilbert filter 18 includes a decimation feature to reduce the sampling rate of the in-phase and quadrature signals for mixing in the mixer 20. The decimation feature eliminates a portion of the data from further consideration to reduce the signal processing burden or to increase response time of the OFDM demodulator 16 as desired. Hilbert filter 18 may be coupled to a notch filter (not shown) to remove the analog FM (frequency modulation) modulated signal component of the data prior to mixing in the mixer 20.

The mixer 20 cooperates with the base-band look-up tables 22 to produce a baseband signal composed of in-phase and quadrature samples. The decimator 24 decimates the in-phase and quadrature samples to obtain a lesser data rate and stores the samples in a buffer memory (not shown). The digital signal processors of the OFDM demodulator 16 preferably read an entire OFDM frame via a burst read.

The synchronizer 26 performs interpolation and timing recovery. The fast Fourier transform emulator 28 converts the data from the time domain to the frequency domain to prepare the data for the forward error correction decoder 30.

The demodulated I vector output and Q vector output are coupled to a forward-error-correction decoder 30. The forward-error-correction decoder 30 includes a deinterleaver 32 coupled to a masking filter 34, which is in-turn coupled to a Viterbi decoder 42. The masking filter 34 includes an identifier 36, an assigner 38, and a buffer memory 40. The masking filter 34 attempts different masks from a library of N possible masks, if feedback from the error rate measurer 44 indicates that the decoded receive signal has an inadequate error rate. The use of different masks may be organized as an iterative process as will be described subsequently in more detail in conjunction with FIG. 3A and FIG. 3B. Referring to FIG. 2, the masks may be applied to the upper side-band 52 alone, the lower side-band 50 alone, or both the upper side-band 52 and the lower side-band 50 simultaneously. Further, the library of masks may be tailored based on the interference environment anticipated, which may be country specific or frequency assignment specific to particular regions of a country.

Within the masking filter 34, the identifier 36 and the assigner 38 communicate with the buffer memory 40 over logical data paths. The masking filter 34 is located in the signal path of the receive signal after the fast Fourier transform emulator 28 and the deinterleaver 32 such that the identifier 36 and the Viterbi decoder 42 are able to readily distinguish the desired data bits and rejected data bits from one another in the frequency domain. The identifier 36 makes a preliminary indication of desired and rejected data bits, while the Viterbi decoder 42, in conjunction with the error rate measurer 44, makes a final indication based upon a history of a bit sequence.

An output of the forward error correction decoder 30 is fed into an error rate measurer 44. The error rate measurer 44 provides feedback to the masking filter 34 and desired bits to the audio signal processor 46. The error rate measurer 44 may perform a cyclical redundancy check (CRC) to estimate the error rate of the receive signal processed by forward-error-correction decoder 30. In an alternate embodiment, the error rate measurer 44 may perform an error-detecting Reed-Solomon code to estimate the error rate of the receive signal processed by the forward-error correction decoder.

The audio signal processor 46 may include a PAC (Perceptual Audio Coder) decoder. The PAC decoder accepts a frame of PAC encoded data and produces samples of the uncompressed audio signal.

FIG. 2 shows a composite signal that may be received by the receiver of FIG. 1. The composite signal is introduced to the receiver at the radio frequency downconverter 10. The composite signal includes an analog frequency modulation signal 54 which is centrally located between a digital upper side-band 52 and a digital lower side-band 50. The digital upper side-band 52 and lower side-band 50 contain multiple signal components (e.g., carriers), which may be referred to as bins. The lower side-band 50 contains lower bin groups 58, while the upper side-band 52 contains upper bin groups 60. The multiple signal components are susceptible to adjacent channel interference from other transmitters. The analog frequency modulation signal 54 is separated from the upper digital side-band by a guard band to reduce interference or eliminate interference between the analog frequency modulation component and the upper digital side-band. Similarly, a guard band is established between the lower side-band 50 and the analog frequency modulation component. The most sensitive or crucial information in the digital upper and lower side-band 50s is preferably placed closest to the analog frequency modulation signal 54 to keep such information protected from adjacent channel interference. The broadcaster may be able to adjust the composite signal at the transmitter to increase the guard band as desired or reduce the percentage of modulation of the analog frequency modulated component to afford further protection to the innermost signal components of the digital upper side and the digital lower side-band 50.

As used herein, the full bandwidth comprises an upper side-band 52 and a lower side-band 50, regardless of the presence or absence of the analog FM signal. Bins lie within each side-band. In a preferred embodiment, the bins are carrier signals which may be modulated as a dual-level or multi-level frequency-shift keying (FSK), amplitude-shift keying (ASK), a phase-shift keying (PSK) signal, or a quadrature amplitude modulated (QAM) signal, for example. In general, each bin may represent up to N levels. Thus, if each bin represents 2 levels, one bit of the receive signal data of the composite signal may correspond to each bin. Through digital signal processing, receive signal data may be readily manipulated at the bin level or at the level of groups of bins.

Figure 3A:
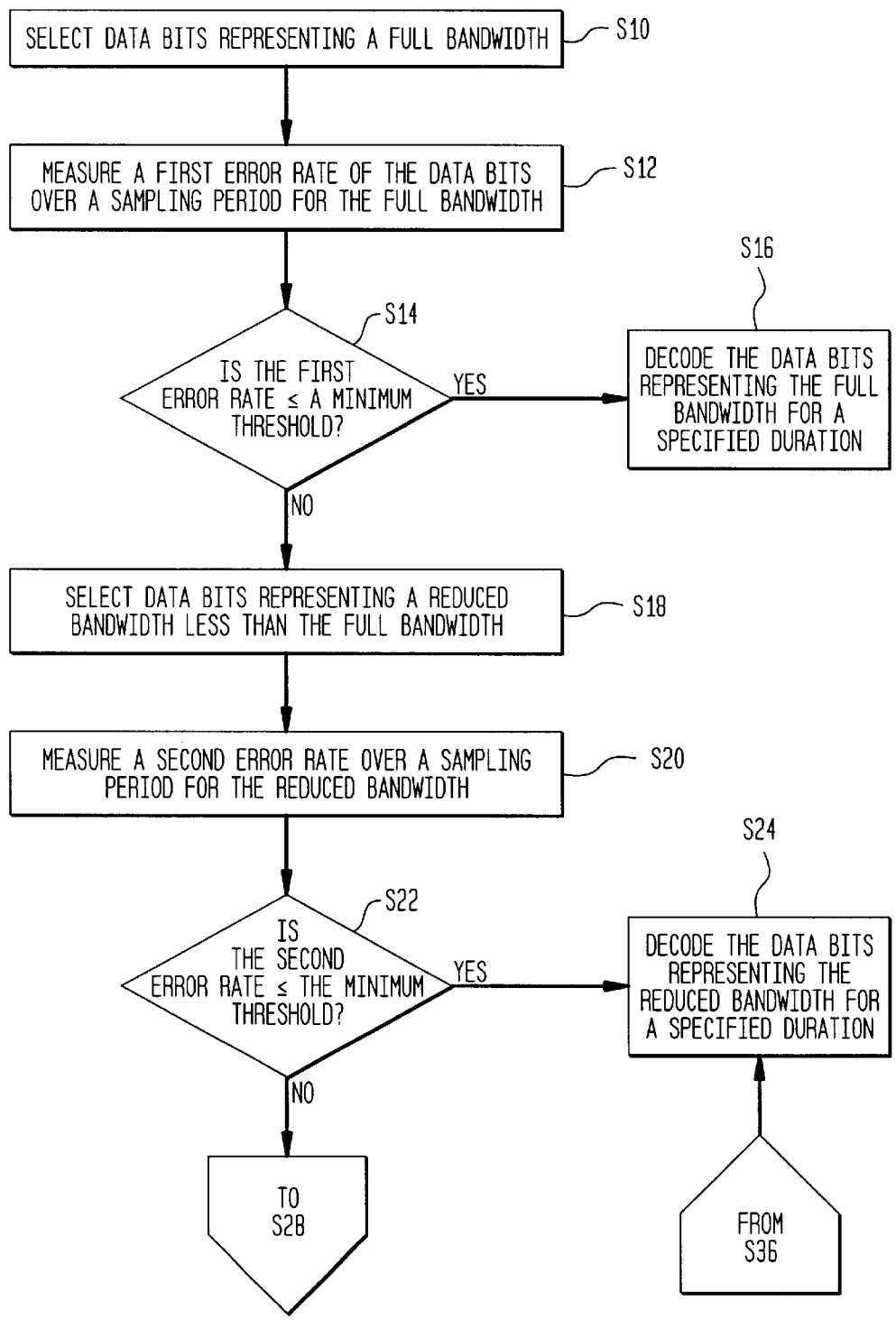
FIG. 3A and FIG. 3B is a flow chart illustrating a method for dynamically compensating for adjacent channel interference to a frequency division multiplex signal in accordance with the invention.
Figure 3B:
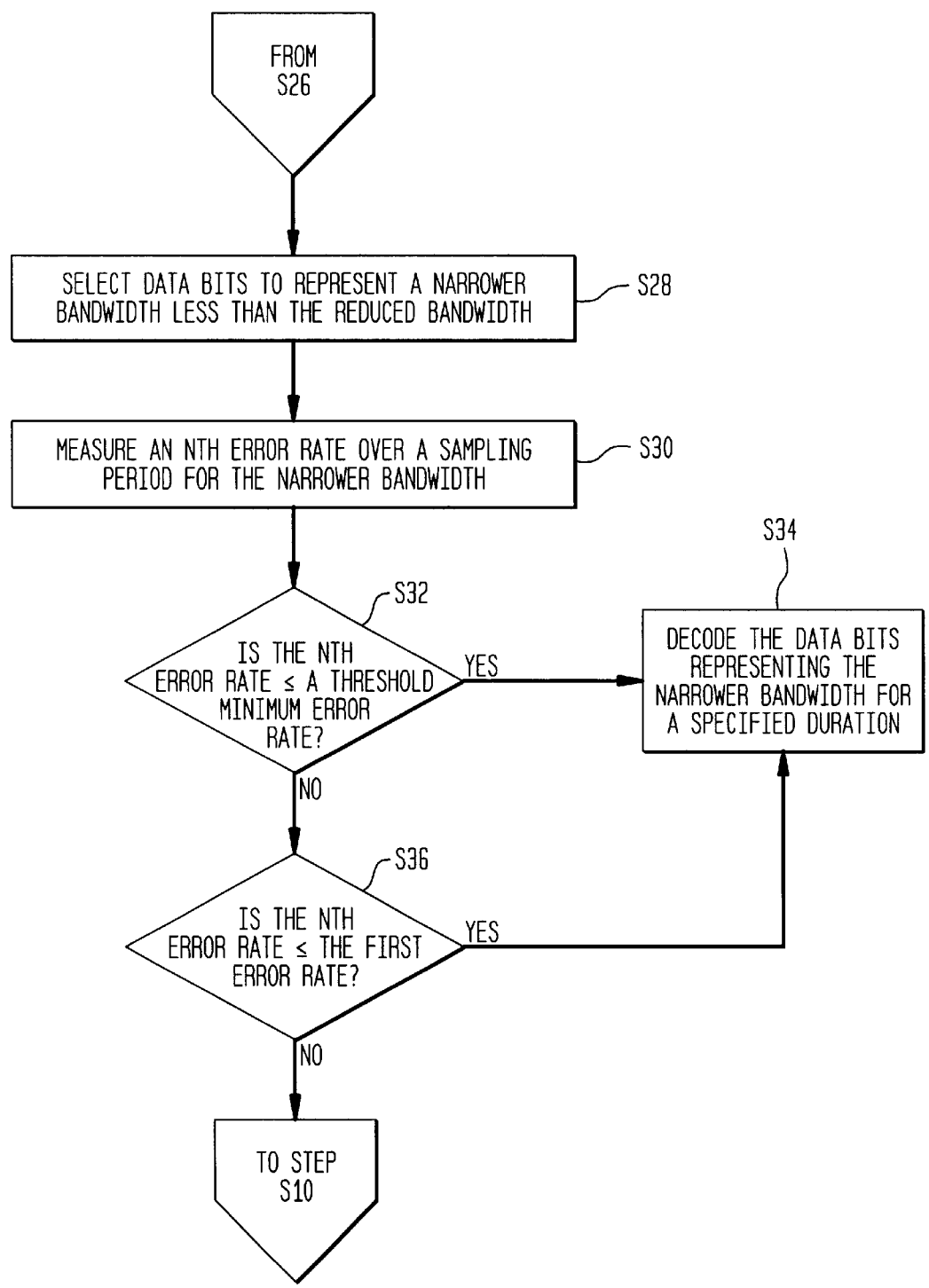

FIG. 3A and FIG. 3B illustrate a method for reducing interference in the reception of a composite signal of FIG. 2, such as an OFDM signal. Starting in step S10, the selector selects data bits representing a full bandwidth of the OFDM carriers. The full bandwidth preferably represents all of the bins within the upper side-band 52 and the lower-side band 50. The receiver may combine the bins or associated receive data bits in a simple combining process where the full bandwidth is selected. After step S10 in step S12, an error rate measurer 44 measures a first error rate of the data bits over a time period of OFDM symbols for the full bandwidth which may be realized in the digital frequency domain, for example. The first error rate can provide an indication of whether the received signal is impinged upon by adjacent-channel interference. Severe fading may sometimes affect the first error rate such that the definite detection of adjacent channel interference considers both signal strength and the first error rate. The time period is generally a sufficient period to gather and measure the first error rate in a manner that provides a reliable indication of the performance of the receive signal.

Following step S12 in step S14, a processor determines if the first error rate is less than or equal to a minimum threshold. The minimum threshold is preferably selected to be close to the point of failure of reliable reception. If the first error rate is less than or equal to a minimum threshold, then the data bits are decoded by a decoder in step S16. The data bits decoded in step S16 represent the selected data bits that were selected in step S10; hence, include data bits associated with the full bandwidth of the receive signal.

The data bits are decoded with these bins for a specified duration. Once the validity duration expires, the process may start again by progressing from step S16 to step S10.

However, if the first error rate is greater than a minimum threshold, then in step S18 the selector selects data bits representing a reduced bandwidth less than the full bandwidth. Data bits representing the reduced bandwidth are selected where the data bits associated with the full bandwidth yield unacceptable performance. Thus, a reduced bandwidth must be attempted to provide a desired reliability of the reception. In a preferred example, the reduced bandwidth is formed by eliminating bins associated with the outermost frequency components of the full bandwidth. In one example, the outermost bin, which represents the lowest frequencies of the lower side-band 50, is eliminated first. In another example, the outermost bin, which represents the highest frequencies of the upper side bin, is eliminated first. In a further example, both outermost bin groups of the upper and lower sidebands are eliminated together.

The bit selection strategies are chosen to be compatible with the forward error correction (FEC) approach. That is, by puncturing bits assigned to the outermost bins, for example, the code rate increases from a ⅔ rate to a ½ rate. The preferential bit selection strategy provides increased immunity against adjacent channel interference, with a minimal sacrifice of reduced fading tolerance. For example, controlled puncturing readily provides a substantial coding gain at ½ rate code to preserve immunity against fading. However, if a random puncturing were used, potentially all immunity against fading would be sacrificed.

In any event, after step S18 in step S20, the error rate measurer 44 measures a second error-rate over a time period for the reduced bandwidth.

Following the measurement in step S20, in step S22 the processor determines if the second error rate is less than or equal to the minimum threshold. If the second error rate is less than or equal to the minimum threshold, in step S24 the decoder decodes the data bits representing the reduced bandwidth for a specified duration. Accordingly, the method selects an optimum, or at least the most suitable, data bits corresponding either to the full bandwidth or the reduced bandwidth to reduce adjacent channel interference of the receive signal.

If, however, in step S22 the second error rate is greater than the minimum threshold, then the method continues in step S28. In step S28 (as shown in FIG. 3B), the selector selects data bits to represent a narrower bandwidth, which is less than the reduced bandwidth. The narrower bandwidth may be formed by eliminating the outermost bins that remain in the reduced bandwidth. Accordingly, in step S28 the data bits are selected such that adjacent channel interference is minimized to the upper side-band 52, the lower side-band 50, or both. In the context of the composite signal of FIG. 2, the narrowest bandwidth permitted in step S28 is the presence of the entire upper side-band 52 (i.e. all upper bins) and the accompanying absence of the entire lower side-band 50 (i.e. all lower bins), or vice versa. If the narrowest bandwidth were to filter out any more than the upper side-band 52 or the lower side-band 50, the reception characteristics would be degraded so as to offer insufficient immunity to fading. After selecting the data bits representing the narrower bandwidth in step S28, the error rate measurer 44 measures a third error rate over a time period for the narrower bandwidth in step S30.

In step S32, if the third error rate is less than or equal to the threshold minimum error rate, then the method continues with step S34. In step S34, the decoder decodes the data bits representing the narrower bandwidth for a specified duration. However, if in step S32 the processor determines that the third error rate is greater than a threshold minimum error rate, then the method continues with step S36.

In step S36, the processor determines if the third error rate is less than or equal to the first error rate. If the third error rate is less than or equal to the first error rate, then the decoder decodes the data bits representing the narrower bandwidth for the specified duration in step S34. If, however, the third error rate is greater than the first error rate in step S36, then the method continues back at step S10 in which the decoder decodes the data bits representing the full bandwidth for a specified duration.

After the expiration of the specified duration in step S16, step S24, or step S34, the method may begin again at step S10. The foregoing method takes a dynamic or on-the-fly approach to determining a suitable bandwidth realized in the digital frequency domain for the receive signal. The suitable bandwidth is readily realized in the digital domain at baseband frequencies by selection of data bits representing the full band-width, the reduced band-width, or the narrower band-width. The foregoing hierarchy of band-widths provide a progressively narrower effective reception bandwidth for the receive signal to improve the error-rate performance of the receive signal under conditions of adjacent channel interference. The resultant selected data bits represent an optimum band-width tailored to minimizing adjacent-channel interference while maintaining a minimum threshold error rate. If a minimum threshold error rate can not be achieved, then the method advantageously selects the full bandwidth in step S10 as the best possible situation.

Although FIG. 3A and FIG. 3B show only three groups of bit selection at a full bandwidth, a reduced bandwidth and a narrower bandwidth, the method may be generalized to include any number of N groups of bit selection. Expanding the possible groups of bit selection allows customization of masks that define various narrower bandwidths.

Further, in an alternate embodiment, the method may generate an alert or a warning message for a user informing the user that the error rate of the received signal is not acceptable because the error rate falls below a minimum threshold at the full band-width, the reduced band-width and the narrower band-width. Of course, the user may not be interested in the specific, technical details such that only a simple error message may be provided that the receive signal is out-of-range or otherwise momentarily provides a deficient signal. Naturally, where audio information is carried over the receive signal, the user may hear the high error rate as unacceptable audio quality.

The method shown in FIGS. 3A and 3B proceeds from selecting data bits representing the full bandwidth to representing to selecting the bits representing the narrower bandwidth. Because progressing from the full bandwidth enables the receiver to start operating by using receive data bits associated with the full bandwidth, a collateral presumption exists that the first error rate, associated with the full bandwidth, is more probable than not to be less than the minimum threshold in the particular geographic area of the receiver. For example, the operation of the receiver starting from a full-bandwidth may be most appropriate for a rural area or other areas where adjacent channel interference is not prevalent, but where fading resistance is required. However, in an alternate embodiment the evaluations in FIG. 3A and FIG. 3B could progress from the selection of the narrower bandwidth data bits to the full bandwidth data bits. Such a technique may be suitable for densely populated urban areas where some degree of adjacent channel interference is virtually always present. Thus, the selection of data bits representing the full bandwidth would be the least used mode in a densely populated area.

A receiver incorporating the method of FIG. 3A and FIG. 3B may further include a switch or a software switch to change the order of execution from starting with a full bandwidth to starting with a narrower bandwidth, or vice versa.

The process of selecting data bits in step S10, step S18, or step S28 representing different bandwidths may be referred to as "masking" data bits. Data bits are masked, such that the masked data bits are ignored by the decoder or other receiving processing equipment on a bin-by-bin basis or on a bin group basis. If adjacent channel interference is severe, the entire upper side-band 52 may be masked if the entire lower side-band (52, 50) is used for the selection of the data bits. Conversely, if the adjacent channel interference is so severe that the entire lower side-band 50 is masked, then the upper side-band 52 should be available for selection of the data bits. The data bits are distributed among the upper and lower side-band 50 in accordance with punctured convolutional coding techniques so that either the lower side-band 50 or the upper side-band 52 contains sufficient information for decoding the received signal. In some cases, one sideband may perform better than both side-bands where adjacent channel interference severely degrades the receive signal.

If all side-bands are present, and the data bits are selected to represent the full bandwidth, then a ⅔ rate code is available for redundancy and error checking. A ⅔ code rate means that for every 2 information bits, 3 redundancy bits are available. In a case where either the upper side-band 52 or the lower side-band 50 is completely masked, the code rate goes from a ⅔ rate code to a ⅕ rate code. Accordingly, for every 4 information bits, only 1 redundancy coding bit is present. The reduction of the redundancy coding bits reduces the receive signals tolerance to fading and high noise levels.

In accordance with the invention, a significant feature of the method of interference reduction is the ability to achieve rate codes between the ⅔ rate code and the ⅕ rate code. Instead of the abrupt reduction in the coding and redundancy performance with the elimination of an entire side-band, a digital signal processing technique called soft-combining permits intermediate code rates between the ⅔ code rate and the ⅕ code rate. For example, instead of having a ⅔ or a ⅕ coding rate, the soft-combining technique facilitates having a ½ code rate by eliminating both outermost groups of bins. The flexibility of having the intermediate code rates allows the receiver to be programmed to provide appropriately maximum resistance to fading and noise that might otherwise not be possible with less granularity or achievable pitch in the code rates.

In steps S12, S20, and S30, the selection durations may feature hysteresis to prevent switching back and forth between selection of data bits representing the full bandwidth, the reduced band with, the narrower bandwidth or other different bandwidths. Accordingly, if the data bits are selected representing a particular bandwidth over a selection period, the change to a different selection of data bits representing a different bandwidth may not be permitted until a hysteresis factor multiplied by the specified duration wherein the hysterics factor is greater than 1.

Figure 4:
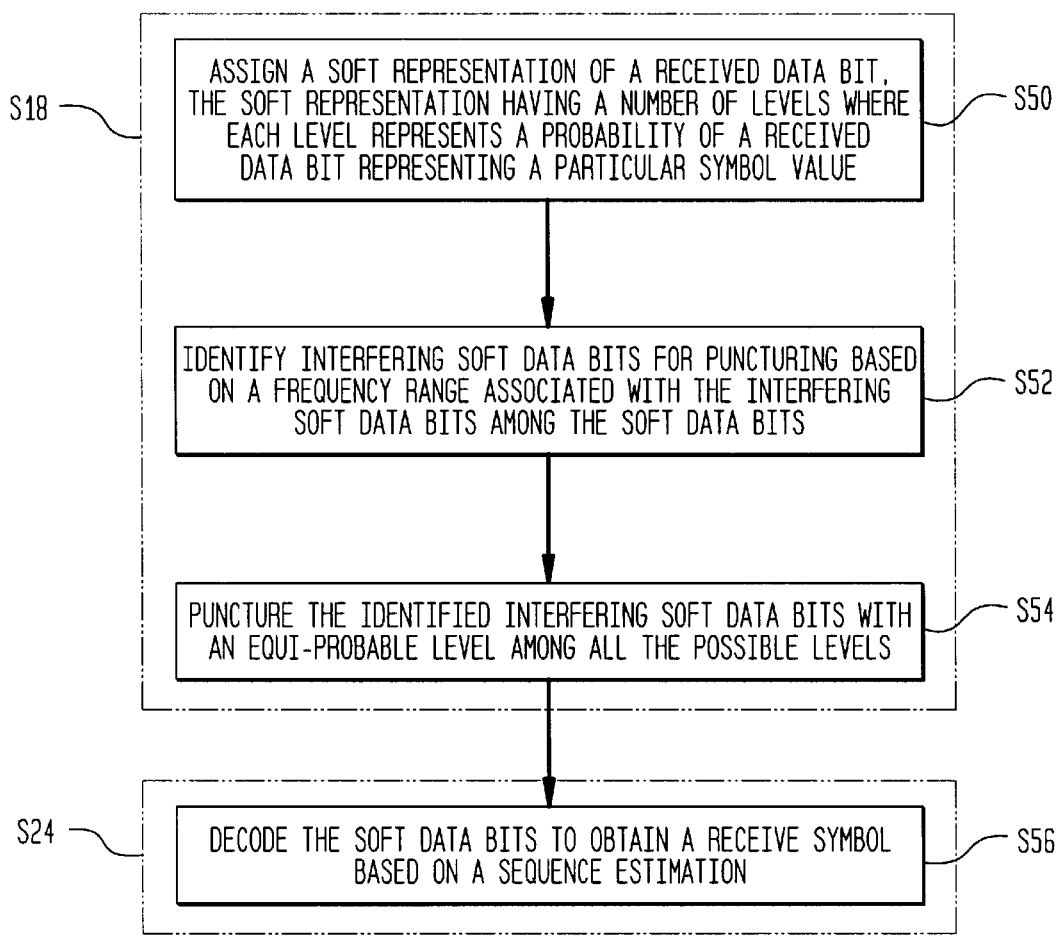
FIG. 4 is a flow chart providing details on bit manipulation techniques for compensating for adjacent channel interference to a frequency division multiplex signal in accordance with the invention.

In accordance with the invention, FIG. 4 shows a flow chart for manipulation of data bits to reduce adjacent channel interference. The procedure of FIG. 4 provides illustrative techniques for carrying out steps S18 and S24 of FIG. 3A. Like reference numbers indicate like elements in FIG. 3A and FIG. 4. Starting in step S50, the demodulator assigns a soft representation of a received data bit. For example, in-phase symbol array and a quadrature symbol array may be processed through a differential decoder and a complex rotator to assign the soft representations. The soft representation has a number of levels, called logical distances, where each level or logical distance represents a probability of a received data bit representing a particular symbol value. For example, the decoder may assign an n-bit soft representation of a symbol logic level represented by a most positive or most negative two's-complement hexadecimal value of the n-bit soft representation. The n-bit soft representations are also termed "metrics".

In step S52, an identifier 36 identifies interfering soft data bits for puncturing or masking based on a frequency range associated with the interfering soft data bits among the soft data bits. Puncturing refers to a procedure in the digital domain for forcing a particular value for the data bits regardless of the received value for the data bits associated with the receive signal. In step S52, the identifier 36 may select a mask to form a receive passband in which the interfering bits preferably fall outside of the receive passband. For example, the identifier 36 preferably first identifies the outermost bits associated with the outermost frequency range of the receive signal as the interfering bits. In step S54, the assigner 38 punctures the identified interfering soft data bits with an equi-distant logical distance among the logical distances or equi-probable level amongst all possible levels. For example, the assigner 38 assigns or punctures a value approximately mathematically equidistant between the most positive two's complement hexadecimal value and the most negative twos complement hexadecimal value among the soft representations assigned in step S50.

In step S56, the decoder decodes the soft data bits to obtain a receive symbol based on sequence estimation using minimum accumulated metrics that represent various levels. A logical distance represents a mathematical distance between a soft data bit representation and the particular logical level of a receive symbol. The decoder determines a minimum of a historical sequence of the logical distances after accumulating the logical distances. The decoder finds the most probable logical level of the receive symbol based on an evaluation of the minimum accumulated metrics.

FIG. 5 represents a look-up table that may be used to carry out decoding in step S56. The first row of the look-up table represents inputs of assigned soft representations that were assigned in step S50, for example. The numbers of the first row are signed numbers. That is, signed numbers represent both negative and positive numbers. For example, 7F (hexadecimal) is equal to +127 (base 10), 80 (hexadecimal) is equal to −128 (base 10), and FF (hexadecimal) is equal to −1 (base 10). The second row shows logical distances corresponding to the inputs of the first row. The numbers of the second row are strictly positive numbers. Accordingly, in the second row, 7F (hexadecimal) is equal to +127 (base 10), 80 (hexadecimal) is equal to +128 (base 10), and FF (hexadecimal) is equal to +255 (base 10). The logical distances of the second row are referenced to the logic level of "1" such that the lower the hexadecimal value the more likely the input actually represents a "1". Conversely, the larger the hexadecimal value, the less likely that the input actually represents a "1", or the more likely that the input actually represents a "0". A third row provides mathematical distances associated with corresponding inputs in the first row. The logical distances associated with the third row are referenced to a logic level "0". The numbers of the third row are defined as strictly positive. The lower the hexadecimal value the more likely that the input is actually a "0". Conversely, the larger the input the less likely the input actually represents a "0" and the more likely the input really represents a "1".

As shown in FIG. 5, the two's complement hexadecimal input of 7F represents exactly and unequivocally a "1" and the two's complement hexadecimal input of 80 represents exactly and unequivocally a "0". For a two's complement hexadecimal input of 7F in the first row, the corresponding entry in the second row, immediately below 7F, reflects a logical distance of zero. Similarly, for a two's complement hexadecimal input of 80 in the first row, the corresponding entry in the third row, in the column in line with the 80 entry of the first row, reflects a logical distance of zero.

In FIG. 5, the two's complement hexadecimal input of 0 or FF represents a largest distance between a logic level of a "1" or a "0", which is consistent with an eight-bit binary representation or a two-digit hexadecimal representation. Further, the hexadecimal inputs of 0 is equidistant in logical distance between a "0" and a "1". That is, the absolute distance between the input of 0 and a logic level of "1" is 7F, while the absolute distance between the input of logic 0 and a logic level of "0" is 80. The distance of 7F is merely one hexadecimal value away from 80, so 7F and 80 are approximately equal or substantially equi-distant, as referred to in this specification.

This specification describes various illustrative embodiments of the method and system of the present invention. The scope of the claims are intended to cover various modifications and equivalent arrangements of the illustrative embodiments disclosed in the specification. Therefore, the following claims should be accorded the reasonably broadest interpretations to cover modifications, equivalent structures and features which are consistent with the spirit and scope of the invention disclosed herein.

The following is claimed:

1. A method for reducing interference to a receive signal, the method comprising the steps of:
    evaluating error rates of receive signal bits associated with different receive bandwidths of the receive signal;
    selecting receive data bits associated with a desired bandwidth of the different receive bandwidths based on a suitably low error rate associated with the evaluated receive signal bits, wherein the selecting step comprises weighting desired data bits representing the desired bandwidth differently than rejected data bits representing a rejected bandwidth, where the receive data bits include the desired data bits and the rejected data bits; and
    decoding the selected receive data bits associated with the desired bandwidth.

2. A method for reducing interference to a receive signal, the method comprising the steps of:
    evaluating error rates of receive signal bits associated with different receive bandwidths of the receive signal;
    selecting receive data bits associated with a desired bandwidth of the different receive bandwidths based on a suitably low error rate associated with the evaluated receive signal bits; and
    decoding the selected receive data bits associated with the desired bandwidth;
    identifying the receive data bits associated with a rejection bandwidth or the desired bandwidth; and
    realizing the desired bandwidth in the digital frequency domain through the identified data bits.

3. The method according to claim 2 wherein the realizing step comprises selectively puncturing the receive data bits with neutral logical values to yield rejected data bits associated with a rejection bandwidth of the receive signal.

4. The method according to claim 2 wherein the realizing step comprises
    discounting an initial received logical value of the rejected bits to a neutral logical value to facilitate the reduction of interference upon decoding of the receive data bits.

5. The method according to claim 2 wherein the selecting step comprises selecting the receive data bits associated with a full bandwidth of the digitally modulated receive signal.

6. The method according to claim 2 wherein the selecting step comprises selecting inner data bits associated with an upper side-band or a lower side-band, where the inner data bits are closer to a carrier frequency of the receive signal than outermost data bits.

7. The method according to claim 2 wherein the selecting step comprises selecting data bits associated with one of an upper side-band or the lower side-band of the digitally modulated receive signal.

8. The method according to claim 2 wherein the selecting step selects the receive data bits based on the evaluated error rate being less than or equal to a minimum threshold.

9. The method according to claim 2 wherein the selecting step selects the receive data bits associated with a reduced bandwidth, as opposed to a full bandwidth among the different receive bandwidths, based on the evaluated error rate being greater than a first minimum threshold.

10. The method according to claim 9 wherein the selecting step selects the receive data bits associated with a narrower bandwidth, as opposed to the reduced bandwidth, based on the evaluated error rate being greater than a second minimum threshold.

11. A method for reducing interference to a digitally modulated receive signal, the method comprising the steps of;
  selecting receive data bits associated with at least one corresponding bandwidth of a receive signal;
  measuring error rates associated with the selected receive data bits of the at least one corresponding bandwidth to determine a particular bandwidth that provides a suitable measured error rate;
  assigning weights to the data bits to represent the determined particular bandwidth; and
  decoding the receive data bits having the assigned weights.

12. The method according to claim 11 wherein the measuring step comprises establishing the suitable measured error rate by comparison to a minimum threshold error rate.

13. The method according to claim 11 wherein the selecting step further comprises identifying rejected data bits associated with a rejection bandwidth of the receive signal.

14. The method according to claim 13 wherein the selecting step further comprises identifying outermost bits of a lower side-band or an upper side-band of the receive signal as the rejected data bits.

15. The method according to claim 13 wherein the selecting step further comprises identifying all of the bits associated with a lower side-band or an upper side-band of the receive signal as the rejected data bits.

16. The method according to claim 11 wherein the selecting step starts with receive data bits associated with a full bandwidth of the receive signal and iteratively progresses toward receive data bits associated with a narrower bandwidth than the full bandwidth.

17. The method according to claim 11 wherein the selecting step starts with receive data bits associated with a narrower bandwidth that a full bandwidth and iteratively progresses toward receive data bits associated with the full bandwidth.

18. A method of decoding data bits associated with a receive signal comprising the steps of:
  assigning soft representations associated with corresponding received data bits, each soft representation having a number of levels wherein each level represents a probability of a received data bit representing a particular symbol value;
  identifying interfering soft data bits for puncturing based on a frequency range associated with the interfering soft data bits among the soft representations, the interfering soft data bits potentially or actually corrupted by interference to the receive signal;
  puncturing the identified interfering soft data bits with an equiprobable level amongst possible levels; and
  decoding the soft representations to obtain a receive symbol.

19. The method according to claim 18 wherein the decoding step includes decoding the soft representations based on a sequence estimation using a minimum accumulated metrics that represent various levels.

20. The method according to claim 18 further comprising the step of:
  determining a logical distance corresponding to each of the soft data bits, the logical distance indicating a mathematical distance between a soft data bit and the particular symbol value.

21. The method according to claim 19 wherein the decoding step comprises the steps of.
  determining a minimum of a historical sequence of logical distances after accumulating the logical distances;
  finding the most probable symbol value of the receive symbol based on an evaluation of the minimum.

22. The method according to claim 18 wherein the identifying step includes selecting a mask representing a receive passband and wherein the interfering bits fall outside of the receive passband.

23. The method according to claim 18 wherein the identifying step identifies the outermost bits associated with the outermost frequency range of the receive signal as the interfering soft data bits.

24. The method according to claim 18 wherein the assigning step includes assigning a multi-bit soft representation with a high logic level being represented by one of a most positive and a most negative two's-complement hexadecimal value of the multi-bit soft representation.

25. The method according to claim 18 wherein the puncturing step includes assigning a value approximately equidistant between a most positive two's complement hexadecimal value and a most negative twos complement hexadecimal value as the equiprobable level.

26. A receiver for reducing interference to a receive signal comprising:
  a measurer for evaluating error rates of receive signal bits associated with different receive bandwidths of the receive signal;
  a masking filter for selecting the receive data bits associated with a desired bandwidth of the different receive bandwidths, based on a suitably low error rate associated with the receive signal bits for the desired bandwidth, wherein the masking filter is adapted to weigh desired data bits representing the desired bandwidth differently than rejected data bits representing a rejected bandwidth, where the receive data bits include the desired data bits and the rejected data bits.

27. A receiver for reducing interference to a receive signal comprising:
  a measurer for evaluating error rates of receive signal bits associated with different receive bandwidths of the receive signal; a masking filter for selecting the receive data bits associated with a desired bandwidth of the different receive bandwidths, based on a suitably low error rate associated with the receive signal bits for the desired bandwidth, wherein the masking filter is adapted to discount an initial received logical value of the rejected bits to a neutral logical value to facilitate the reduction of interference upon decoding of the receive data bits.

28. The receiver according to claim 27 wherein the masking filter is adapted to select the receive data bits associated with a reduced bandwidth, less than a full bandwidth, of the receive signal if the measured error rate is greater than a minimum threshold.

29. A receiver system for decoding data bits of a receive signal, the receiver system comprising:
  an assigner for assigning soft representations o received data its, each soft representation having a number of levels wherein each level represents a probability of a received data bit representing a particular symbol value;
  an identifier for identifying interfering soft data bits for puncturing based on a frequency range associated with the interfering soft data bits among the soft data bits, the interfering soft data bits potentially or actually corrupted by interference to the receive signal;
  a masking filter for puncturing the identified interfering soft data bits with an equiprobable level amongst possible levels; and a decoder for decoding the soft representations to obtain a receive symbol.

30. The receiver system according to claim 29 wherein the decoder is adapted to decode the soft data bits based on a sequence estimation using minimum accumulated metrics that represent various levels.

31. The receiver system according to claim 29 method wherein the masking filter selects a mask representing a receive passband and wherein the interfering bits fall outside of the receive passband.

32. The receiver system according to claim 29 wherein the identifier identifies the outermost bits associated with the outermost frequency range of the receive signal as the interfering soft data bits.

33. The receiver system according to claim 29 wherein the assigner assigns a multi-bit soft representation with a high logic level represented by one of a most positive and a most negative two's-complement hexadecimal value of the multi-bit soft representation.

34. The receiver system according to claim 29 wherein the masking filter assigns a value approximately equidistant between a most positive two's complement hexadecimal value and a most negative twos complement hexadecimal value as the equiprobable level.

* * * * *